(12) United States Patent
Wijffels et al.

(10) Patent No.: US 8,131,427 B2
(45) Date of Patent: Mar. 6, 2012

(54) ACTIVE RESETTING FUNCTION FOR A STEERING WHEEL

(75) Inventors: Lodewijk Wijffels, Aachen (DE); Oliver Nehls, Aachen (DE); Anja Damman, Waldfeucht (DE); Sergio Codonesu, Heerlen (NL)

(73) Assignee: Ford Global Technologies, Dearborn, MI (US)

( * ) Notice: Subject to any disclaimer, the term of this patent is extended or adjusted under 35 U.S.C. 154(b) by 741 days.

(21) Appl. No.: 12/233,049

(22) Filed: Sep. 18, 2008

(65) Prior Publication Data
US 2009/0082924 A1 Mar. 26, 2009

(30) Foreign Application Priority Data
Sep. 21, 2007 (DE) .................. 10 2007 045 213

(51) Int. Cl.
*B62D 6/00* (2006.01)
(52) U.S. Cl. ............................. 701/42; 701/41
(58) Field of Classification Search .................... 701/41, 701/42; 180/443, 444, 446
See application file for complete search history.

(56) References Cited

U.S. PATENT DOCUMENTS

| | | | | |
|---|---|---|---|---|
| 6,854,559 | B2* | 2/2005 | Kurishige et al. | 180/446 |
| 7,219,761 | B2* | 5/2007 | Fukuda et al. | 180/444 |
| 2005/0189163 | A1* | 9/2005 | Barton et al. | 180/446 |
| 2006/0069481 | A1* | 3/2006 | Kubota et al. | 701/41 |
| 2007/0239333 | A1* | 10/2007 | Galkowski et al. | 701/41 |
| 2007/0273317 | A1* | 11/2007 | Endo et al. | 318/432 |
| 2008/0294313 | A1* | 11/2008 | Aoki et al. | 701/43 |
| 2009/0043443 | A1* | 2/2009 | Wei et al. | 701/29 |
| 2009/0192679 | A1* | 7/2009 | Kobayashi et al. | 701/42 |
| 2010/0286871 | A1* | 11/2010 | Kobayashi et al. | 701/41 |

\* cited by examiner

*Primary Examiner* — Khoi Tran
*Assistant Examiner* — Jason Holloway
(74) *Attorney, Agent, or Firm* — Angela M. Brunetti; Fredrick Owens

(57) ABSTRACT

A method for resetting a steering wheel of a motor vehicle having electric power assisted steering, with a resetting torque being determined in order to move the steering wheel from a diffracted steering position to a neutral position. The resetting torque differs for low and high friction values wherein a signal produced in response to a determined yaw rate is introduced into the determination of the resetting torque. The contribution of the yaw-rate based resetting torque to the total resetting torque increases as the vehicle speed increases.

12 Claims, 2 Drawing Sheets

ACTIVE RESETTING FUNCTION FOR A STEERING WHEEL

CROSS REFERENCE

The inventive subject matter is a continuation of foreign filed application DE 102007045213.8, filed Sep. 21, 2007, whose subject matter is incorporated herein by reference and provides the basis for a claim of priority of invention under 35 U.S.C. §119.

TECHNICAL FIELD

The inventive subject matter relates to a steering wheel of a motor vehicle and more particularly to an active resetting function for a steering wheel

BACKGROUND

Servo steering systems may be in the form of electrically assisted servo steering systems, also called EPAS (Electric Power Assisted Steering), or hydraulically assisted servo steering systems, also called HPAS (Hydraulic Power Assisted Steering). Electrically assisted servo steering systems normally have a higher friction level, that is to say a greater steering resistance, than hydraulically assisted servo steering systems. At low vehicle speeds, this results in a reduced capability to reset the steering wheel to the neutral position, in which the steering wheel steers the vehicle straight ahead. For this reason, an active resetting function may be implemented in the electrical servo steering, or in its controller, which generates an additional torque in order to reset the steering wheel to the straight-ahead position (neutral position). This resetting torque is based only on input values such as the vehicle speed and the steering wheel position. Therefore, the resetting torque has the same magnitude when the friction value is high and when it is low (the friction of the tires on the road surface). Particularly when the friction value is low, the resetting torque that is produced is greater than necessary, and results in an excessive resetting capability, and can also result in the vehicle driver having an undesirable, artificial steering sense, which may be disturbing to the vehicle driver.

There is a need for optimizing a method of resetting a steering wheel such that a resetting torque is made available for both high and low friction values.

SUMMARY

A method for yaw-rate-dependent active resetting function is provided, which determines the required resetting torque on the basis of the instantaneous vehicle states such as the vehicle speed and the yaw rate. The resetting torque is not directly dependent on driver inputs, but on the instantaneous vehicle behavior. The result is a resetting torque which has different magnitudes when the friction value is high than when the friction value is low. When the friction value is low, a resetting torque of lower magnitude is produced.

DESCRIPTION OF DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention.

Figure 1:
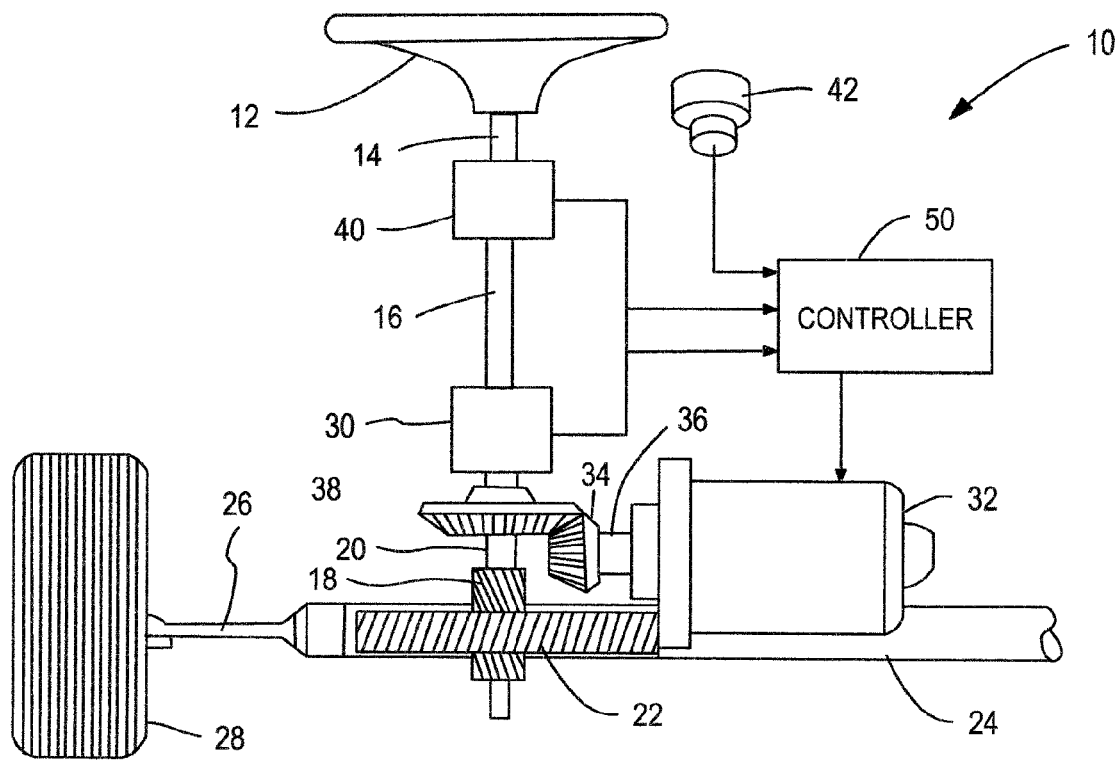
FIG. 1 is an electrically assisted power steering system.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and tire assembly 28 in a conventional manner. A steering torque sensor 30 is incorporated in the steering shaft 16 for detecting a steering torque applied by an operator to the steering shaft 16 by way of the steering wheel 12. A steering wheel angle sensor 40 senses a steering wheel angle. An electric motor 32 includes an output gear 34 mounted on an output shaft 36 for drivingly engaging an assist input gear 38 mounted on the steering shaft 16. Alternatively, the electric motor may have its output shaft and an output gear arranged to directly engage the steering rack. A controller 50 receives signals representative of the torque of the steering shaft 16 between sensors 30 and 40. The electric motor may be a DC brush or brushless motor. It may utilize a three-phase alternating current induction motor. It should be noted that a variable reluctance motor may be substituted for the inductance motor without impacting the performance of the inventive subject matter. Induction and variable reluctance motors are typically used in electrically assisted power steering systems because of their low friction and high torque-to-inertia ratio compared to larger electric motors.

Figure 2:
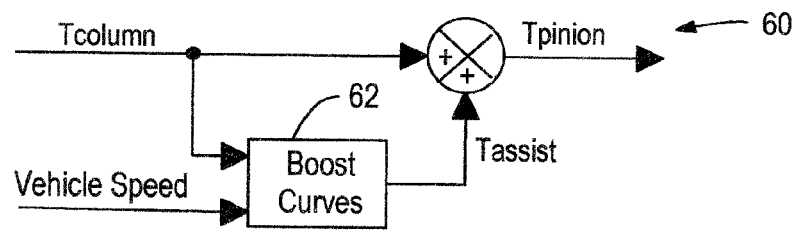
FIG. 2 is a block diagram of torques represented in a typical electric power steering system.

FIG. 2 is a block diagram of a typical electric power steering system 60. In a typical electric power steering system 60, vehicle speed, $V_s$, and steering column torque, $T_{column}$, signals are used, along with boost curves a 62 to determine the amount of assist torque, $T_{assist}$ required to aid the driver in steering the vehicle. The assist torque, $T_{assist}$, is carried out by the electric motor, (see FIG. 1).

Figure 3:
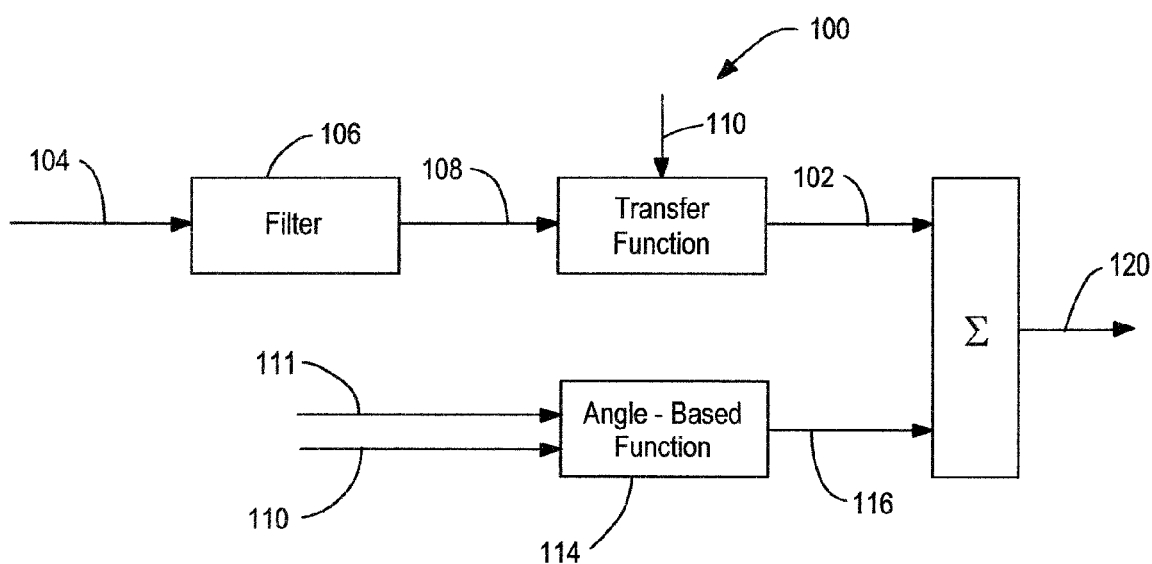
FIG. 3 is a block diagram of an algorithm for determining a resetting torque according to the inventive subject matter.

FIG. 3 shows a circuit and an algorithm 100 of the inventive subject matter for determination of a yaw-rate-based or yaw-rate-dependent resetting torque 102. The algorithm 100 is implemented in the controller 50 for the electrically assisted power steering system (EPAS) or in a controller in the vehicle. The power steering system has an actuator which introduces steering torques into a steering system.

A determined yaw rate 104 is supplied as a signal to a filter 106. The determined yaw rate 104 can be measured or estimated. In the present, preferred exemplary embodiment, the determined yaw rate 104 measured using conventional measurement apparatuses is supplied to the filter 106.

The determined yaw rate 104 is filtered in the filter 106 such that a filtered yaw rate signal 108 is produced as the output signal. The filtered yaw rate signal 108 is supplied together with a vehicle speed signal 110 to a block 112 in which a transfer function, for example a "look-up table", is stored. In one preferred refinement, a 3D look-up table is stored in the block 112.

As the output signal, the block 112 produces the yaw-rate-based or yaw-rate-dependent resetting torque 102. The determined yaw-rate-dependent resetting torque 102 may act directly on the actuator for the servo steering, resulting in the steering wheel being reset from a deflected position to a straight-ahead position (neutral position), in which the vehicle is steered straight ahead.

When the magnitude of the speed is zero, a yaw rate with a magnitude of zero is, of course, also measured. In a situation such as this, a resetting torque 120 with a magnitude of zero would also be produced.

An angle-based active resetting function 114 is therefore implemented in a worthwhile form in the controller for the servo steering or the vehicle, and produces an angle-based resetting torque 116. This is achieved by supplying the angle-based active resetting function 114 with input signals comprising on the one hand the vehicle speed 110 and on the other hand a steering wheel angle 111.

The yaw-rate-dependent resetting torque 102 and the angle-based resetting torque 116 are added to one another (addition block 118), such that a total resetting torque 120 acts as the output signal on the actuator.

The contribution from the angle-based resetting torque 116 to the total resetting torque 120 is, of course, reduced continuously variably as the vehicle speed increases, preferably down to a magnitude of zero, so that, at relatively high speeds and relatively low friction values, in particular, only the yaw-rate-dependent resetting torque 102 acts as the total resetting torque 120 on the actuator.

As the vehicle speed increases, the influence of the driver-dependent inputs (steering wheel angle) is increasingly reduced, until only the instantaneous vehicle states or the current vehicle behavior is introduced into the determination of the resetting torque 120, and this then completely represents the yaw-rate-dependent resetting torque 102. This results in a resetting torque 120 of different magnitude when the friction value is low and when it is high.

The inventive subject matter is based on the object of optimizing a method of the type mentioned initially, using simple means, such that a resetting torque 120 with a different magnitude is made available on the one hand for a low friction value and on the other hand for a high friction value. According to the inventive subject matter, a signal 102, produced in response to a determined yaw rate, is introduced into the determination of the resetting torque. The yaw rate may be measured and/or estimated, with the determined yaw rate 104 being supplied as a signal to a filter, such that a signal is produced which represents a filtered yaw rate. The invention advantageously provides that the filtered yaw rate 108 is supplied, together with a signal which represents a vehicle speed 110, to a block in which a transfer function 112, for example a 3D parameter table or a so-called "3D look-up table", is stored, such that the yaw-rate-based or the yaw-rate-dependent resetting torque 102 is produced from the input signals comprising the vehicle speed and yaw rate or filtered yaw rate by means of empirical values which are stored in the parameter table. The yaw-rate-based resetting torque or the yaw-rate-dependent resetting torque acts as an additional torque on the actuator for the servo steering.

A yaw-rate-dependent active resetting function is advantageously provided, which determines the required resetting torque on the basis of the instantaneous vehicle states such as the vehicle speed and the yaw rate. This resetting torque is not directly dependent on driver inputs, but on the instantaneous vehicle behavior. The result is a resetting torque being produced which has different magnitudes on the one hand when the friction value is high and on the other hand when the friction value is low. When the friction value is low, a resetting torque of lower magnitude is produced.

When the yaw rate has a magnitude of zero, a yaw-rate-dependent resetting torque is also produced with a magnitude of zero. It is therefore worthwhile for the active yaw-rate-dependent resetting function to be implemented as an additional function, in addition to the active, angle-based resetting function which is provided in any case (input signal, vehicle speed, steering wheel angle). This is advantageous in particular at very low speeds. As the vehicle speed increases, the angle-based contribution of the total resetting torque can be reduced continuously variably, preferably down to a magnitude of zero.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for actively resetting a steering wheel of a motor vehicle having electric power assisted steering system, the method comprising the steps of:

receiving a signal representative of a determined yaw rate at a controller;

receiving a signal representative of a steering wheel angle at the controller;

receiving a signal representative of a vehicle speed at the controller;

applying a transfer function to the determined yaw rate and a vehicle speed to produce a yaw-rate based resetting torque;

applying an angle-based active resetting function to the steering wheel angle and the vehicle speed to produce an angle-based resetting torque;

summing the angle-based resetting torque and the yaw-rate based resetting torque to determine a total resetting torque; and outputting the resetting torque to the electric power assisted steering system thereby resetting the steering wheel from a deflected position to a neutral position.

2. The method as claimed in claim 1 wherein the step of summing the resetting torques to determine a total resetting torque further comprises a contribution of the yaw-rate based resetting torque to the total resetting torque increasing as the vehicle speed increases.

3. The method as claimed in claim 2 wherein the determined yaw rate is a measured yaw rate.

4. The method as claimed in claim 2 wherein the determined yaw rate is an estimated yaw rate.

5. The method as claimed in claim 2 further comprising the step of filtering the determined yaw rate.

6. The method as claimed in claim 1 wherein the transfer function further comprises a look-up table to produce the yaw-rate based resetting torque.

7. The method as claimed in claim 6 wherein the look-up table is a three-dimensional look-up table.

8. A method for actively resetting a steering wheel of a motor vehicle having electric power assisted steering system, the method comprising the steps of:

receiving a signal representative of a determined yaw rate at a controller;

filtering the determined yaw rate;

receiving a signal representative of a steering wheel angle at the controller;

receiving a signal representative of a vehicle speed at the controller;

applying a transfer function to the filtered yaw rate and the vehicle speed to produce a yaw-rate based resetting torque;

applying an angle-based active resetting function to the steering wheel angle and the vehicle speed to produce an angle-based resetting torque;

summing the angle-based resetting torque and the yaw-rate based resetting torque to determine a total resetting torque; and outputting the resetting torque to the electric power assisted steering system thereby resetting the steering wheel from a deflected position to a neutral position, wherein the total resetting torque further comprises a contribution of the yaw-rate based resetting torque to the total resetting torque increasing as the vehicle speed increases.

9. The method as claimed in claim 8 wherein the determined yaw rate is a measured yaw rate.

10. The method as claimed in claim 8 wherein the determined yaw rate is an estimated yaw rate.

11. The method as claimed in claim 8 wherein the transfer function further comprises a look-up table to produce the yaw-rate based resetting torque.

12. The method as claimed in claim 11 wherein the look-up table is a three-dimensional look-up table.

* * * * *